United States Patent
Fouillot

(10) Patent No.: US 9,756,636 B2
(45) Date of Patent: Sep. 5, 2017

(54) METHOD FOR TRANSMISSION OF MESSAGES HAVING DIFFERENT PRIORITY LEVELS BETWEEN TRANSMITTER-RECEIVER NODES OF AN AD HOC NETWORK

(71) Applicant: THALES, Neuilly sur Seine (FR)

(72) Inventor: Pascale Fouillot, Gennevilliers (FR)

(73) Assignee: Thales, Neuilly sur Seine (FI)

( * ) Notice: Subject to any disclaimer, the term of this patent is extended or adjusted under 35 U.S.C. 154(b) by 225 days.

(21) Appl. No.: 14/584,651

(22) Filed: Dec. 29, 2014

(65) Prior Publication Data
US 2015/0189649 A1 Jul. 2, 2015

(30) Foreign Application Priority Data
Dec. 31, 2013 (FR) ...................................... 13 03122

(51) Int. Cl.
*H04W 72/04* (2009.01)
*H04W 74/08* (2009.01)
(Continued)

(52) U.S. Cl.
CPC ....... *H04W 72/0446* (2013.01); *H04W 72/10* (2013.01); *H04W 72/1247* (2013.01);
(Continued)

(58) Field of Classification Search
None
See application file for complete search history.

(56) References Cited

U.S. PATENT DOCUMENTS

| | | | | |
|---|---|---|---|---|
| 6,567,396 B1 * | 5/2003 | Pohjanvouri | ..... | H04L 29/12009 370/349 |
| 2002/0075941 A1 | 6/2002 | Souissi et al. | | |
| 2013/0294427 A1* | 11/2013 | Kim | ...................... | H04W 16/14 370/338 |

FOREIGN PATENT DOCUMENTS

| | | |
|---|---|---|
| EP | 2440001 A1 | 4/2012 |
| EP | 2466981 A1 | 6/2012 |

OTHER PUBLICATIONS

Search Report for FR Application 1303122 dated Oct. 14, 2014.

* cited by examiner

*Primary Examiner* — Eunsook Choi
(74) *Attorney, Agent, or Firm* — Thompson Coburn LLP

(57) ABSTRACT

The message transmission method for transmitting messages in an ad hoc network comprises at least two transmitter-receiver nodes that are capable of receiving and transmitting messages. The nodes communicate with each other through the despatch of messages within random access time slots organized in frames. The nodes of the network are distributed into groups in accordance with a basic distribution rule. The nodes in each group have the right to send messages in one time slot per frame of a predefined subset of frames specific to the group in accordance with the basic distribution rule.

The messages include at least messages having a low priority level and messages having a high priority level. Each of the nodes transmits the low priority level messages only in one time slot per frame of the predefined subset of frames specific to its own group. Each of the nodes transmits the high priority level messages in one time slot (c1) per frame of the predefined subset of frames specific to its own group (T2) and in at least one other time slot (c2, c3). The (Continued)

node transmits any message having a high priority level a greater number of times than any message having a low priority level.

10 Claims, 17 Drawing Sheets

(51) Int. Cl.
    *H04W 72/10*     (2009.01)
    *H04W 72/12*     (2009.01)
    *H04W 84/18*     (2009.01)
    *H04L 1/00*     (2006.01)

(52) U.S. Cl.
    CPC ........... *H04W 74/0833* (2013.01); *H04L 1/00* (2013.01); *H04W 84/18* (2013.01)

|  | Slot 1 | Slot 2 | Slot 3 | Slot 4 |
|---|---|---|---|---|
| Node 1 | Transmission | | | |
| Node 2 | | Transmission | | |
| Node 3 | | Transmission | | |
| Node 4 | | | | Transmission |
| Node 5 | | | Transmission | |
| Node 6 | | | | Transmission |
| Node 7 | | | | Transmission |

7 Nodes / 4 Slots
7/4 = 1.75
k=2.5

FIG.5

|  | Slot 1 | Slot 2 | Slot 3 | Slot 4 | Slot 5 |
|---|---|---|---|---|---|
| Node 1 | Transmission | | | | |
| Node 2 | | Transmission | | | |
| Node 3 | | Transmission | | | |
| Node 4 | | | | Transmission | |
| Node 5 | | | Transmission | | |
| Node 6 | | | | | Transmission |
| Node 7 | | | | | Transmission |
| Node 8 | | | Transmission | | |
| Node 9 | | Transmission | | | |
| Node 10 | | | | | Transmission |

10 Nodes / 5 Slots
10/5 = 2
k=2.6

FIG.6

|  | Frame 13 | Frame 14 | Frame 15 |
|---|---|---|---|
| N1 | Subjected to q=2 Tx | Subjected to q=2 | Subjected to q=2 Tx |
| N6 | Subjected to q=3 | Subjected to q=3 | Subjected to q=3 Tx |
| N7 | Subjected to q=3 Tx | Subjected to q=3 | Subjected to q=3 |
| N8 | Subjected to q=3 | Subjected to q=3 Tx | Subjected to q=3 |

2nd Transmission during the period of estimation. Not to be taken into account

METHOD FOR TRANSMISSION OF MESSAGES HAVING DIFFERENT PRIORITY LEVELS BETWEEN TRANSMITTER-RECEIVER NODES OF AN AD HOC NETWORK

The present invention relates to a message transmission method for transmitting messages in an ad hoc network comprising at least two transmitter-receiver nodes that are capable of receiving and transmitting messages and communicating with each other through the despatch of messages within random access time slots organised in frames, the nodes of the network being distributed into groups in accordance with a basic distribution rule, with the nodes in each group having the right to send messages in one time slot per frame of a predefined subset of frames specific to the group in accordance with the basic distribution rule.

An ad hoc network is a wireless network capable of being organised without any defined infrastructure. There is no central unit or access point to be used for managing the communications between the various different entities of the network. Any node of such a network is both a transmitter node as well as a receiver node. In such a network a node is considered to be a neighbour of another when they are sufficiently close so as to render communication between them possible. Two nodes located too far apart for communication to be possible between the two, but which are close enough for each to be able to generate destructive interferences on the other, are considered to be interfering nodes.

An ad hoc network can be formed by using the WiFi technology described in the document IEEE Std 802.11™-2007, the IEEE (Institute of Electrical and Electronics Engineers) Standard for Information Technology Telecommunications and information exchange between systems Local and metropolitan area networks—Part 11: Wireless LAN Medium Access Control (MAC) and Physical Layer (PHY) Specifications, 2007.

A node of this network wishing to transmit information to a receiving node of this same network first of all broadcasts to all the neighbouring nodes a message including the signaling data indicating the identifier of the receiving node. A collision occurs at a node when at least two messages are received simultaneously over the same given time slot. If there is no collision with another message, the node receives a confirmation message from the receiving node and then proceeds to send it the relevant useful data. Otherwise it has to perform a retransmission of the signaling data. The retransmission is done only at the end of a waiting period whose duration is calculated by using an algorithm such as an Exponential Backoff algorithm. This time period is often expressed as a multiple of a certain quantum of time, which may vary from one unit to several tens or even hundreds of units. This mechanism makes it possible to limit collisions but results in long periods of wait time between two attempts of transmission of signaling data if the duration of the quanta of time are for example of the order of 5 ms.

A solution that allows for reducing this wait time period while also limiting the collisions is described in the patent application EP 2 440 001. This document describes a method for transmission of information in an ad hoc network comprising at least two transmitter-receiver nodes that are capable of receiving and transmitting data and information and communicating with each other through the despatch of messages in random access time slots organised in frames. This method is characterised in that the nodes of the network are distributed into groups in accordance with a basic distribution rule, with each of the nodes of each of the groups having the right to transmit information only within a predefined subset of frames specific to the group.

However this method processes all of the messages in the same way, and therefore the probability of reception of a message is statistically equivalent for all messages. Thus this method does not take into account the importance of the message.

It is desired for messages having a high priority level to be received with a higher degree of probability than messages having a low priority level. The high priority level messages are, for example warning-alert messages, meant to notify the presence of risk or danger. The low priority level messages are, for example measures transmitted on a continuous basis by sensors.

The goal of the invention is to provide a collision reduction mechanism for reducing collisions that takes into account the priority level of a message to be transmitted and increases the probability of reception of a message having a high priority level as compared to a message having a low priority level.

To this end, the object of the invention relates to a message transmission method characterised in that:
the messages include at least messages having a low priority level and messages having a high priority level;
each of the nodes transmits the low priority level messages only in one time slot per frame of the predefined subset of frames specific to its own group; and
each of the nodes transmits the high priority level messages in one time slot per frame of the predefined subset of frames specific to its own group and in at least one other time slot, the node transmitting any message having a high priority level a greater number of times than any message having a low priority level.

According to other embodiments, the method of the aforementioned type includes one or more of the following characteristic features, taken into consideration individually or in accordance with any technically possible combinations:
each of the nodes transmits the high priority level messages in at least two time slots of a single frame of the predefined subset of frames specific to its own group;
the node transmitting a high priority level message transmits, based on the probability P1 of the message being received by at least one of its neighbouring nodes, the high priority level message in a number of time slots m satisfying the relationship:

$$P1 = \sum_{k=1}^{m} \left[ (-1)^{k+1} C_m^k \left(1 - \frac{k}{n}\right)^{N-T} \prod_{j=0}^{m-1} \left(1 - \frac{k}{n-j}\right)^{T-1} \right]$$

where:
N is the number of neighbouring nodes of the node all transmitting in a same given frame,
T is the number of neighbouring nodes of the node having available a high priority level message to be transmitted, and
n is the number of time slots per frame;
each of the nodes transmits the high priority level messages in a single time slot of at least two distinctly separate frames;
the node transmitting a high priority level message transmits, based on the probability P2 of the message being received by at least one of its neighbouring nodes, the high priority level message in a number of frames q satisfying the relationship:

$$P2 = \sum_{k=1}^{q} \left[ (-1)^{k+1} C_q^k \left(1 - \frac{1}{n}\right)^{k(N-1)} \right]$$

where:

N is the number of neighbouring nodes of the node all transmitting in a same given frame, T is the number of neighbouring nodes of the node having available a high priority level message to be transmitted, and n is the number of time slots per frame;

each of the nodes transmits the high priority level messages in at least two time slots of at least two distinctly separate frames;

the node transmitting a high priority level message transmits, based on the probability P3 of the message being received by at least one of its neighbouring nodes, the high priority level message in a number of time slots m and a number of frames q satisfying the relationship:

$$P3 = \sum_{k=1}^{q} [(-1)^{k+1} C_q^k p(Y)^k]$$

$$\text{with } p(Y) = \sum_{k=1}^{m} \left[ (-1)^{k+1} C_m^k \left(1 - \frac{k}{n}\right)^{N-T} \prod_{j=0}^{m-1} \left(1 - \frac{k}{n-j}\right)^{T-1} \right]$$

where

N is the number of neighbouring nodes of the node all transmitting in a same given frame, T is the number of neighbouring nodes of the node having available a high priority level message to be transmitted, and n is the number of time slots per frame;

only one frame is included in the predefined subset of frames;

each node defines a constraint for the neighbouring nodes;

each node transmits the defined constraint to the neighbouring nodes; and each node defines the group to which it belongs in accordance with the distribution rule based on the constraints received from the neighbouring nodes;

the distribution rule of a node in a group takes into account the number of neighbouring transmitter nodes or interfering nodes that the neighbouring nodes of the node considered have.

The object of the invention also relates to an ad hoc network comprising a set of transmitter-receiver nodes that are capable of receiving and transmitting messages and communicating with each other through the despatch of messages in random access time slots organised in frames, characterised in that each node includes the means for implementation of the method as defined here above.

These characteristic features and advantages of the invention will become apparent on reading the description which will follow, given solely by way of example, and with reference made to the accompanying drawings, in which:

FIG. 3 is a Table showing various different situations during the despatching of messages having a low priority level over one frame;

FIGS. 4, 5 and 6 are tables representing examples of transmission of messages in a frame;

FIGS. 11, 12, 13, 14, 15, 16, 17, 18, and 19 are schematic diagrams representing examples of implementation of the algorithm used by the method according to the invention;

Figure 1:
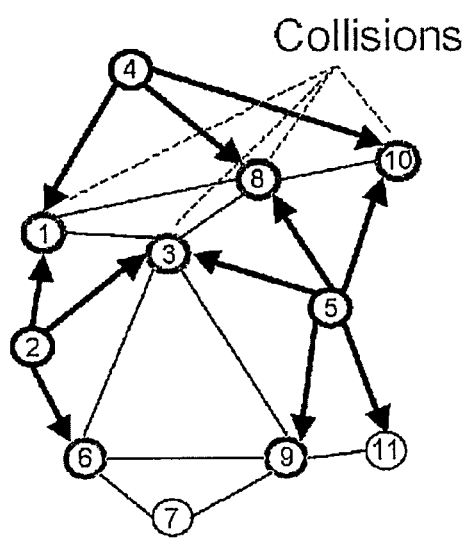
FIG. 1 is a schematic view of an ad hoc network at a given time instant.

The network illustrated in FIG. 1 is for example an ad hoc network for communication between individuals over a field of operations. In this figure, the operational ranges of the nodes of the network are represented by solid lines. This ad hoc network uses random access time slots for transmitting messages. These time slots commonly referred to as slots per the accepted English terminology are distributed into frames with a number of time slots in each frame that is constant from one frame to another.

Each individual is equipped with a transmitter-receiver constituting one node of a network. Each node includes the communication means for receiving and transmitting messages over frames divided into time slots. A time slot allows for the transmission of a message whose size is compatible with the duration of the time slots. Then, at each frame, one message is transmitted during a time slot. The selection of this time slot is done in a random manner. This time slot is used for a broadcast transmission.

Each message has a level of priority selected from at least two priority levels. In the present embodiment considered, there exist messages having a high priority level, like for example, messages to be transmitted as quickly as possible and with reliability, and messages having a low priority level, which are for example messages to be transmitted without any time constraints.

In the following sections, the method is first of all described only for the messages having a low priority level. The processing of messages having a high priority level will be described after a complete presentation of the treatment processing of messages having a low priority level.

The network represented in FIG. 1 comprises of eleven nodes, numbered from 1 to 11, and shows four situations of collision at the level of the nodes 1, 3, 8 and 10. At the level of the node 1, there is a collision between the messages transmitted by the nodes 2 and 4, at the level of the node 3, there is a collision between the messages transmitted by the nodes 2 and 5, at the level of the node 8, there is a collision between the messages transmitted by the nodes 4 and 5, and at the level of the node 10, there is a collision between the messages transmitted by the nodes 4 and 5.

Figure 2A:
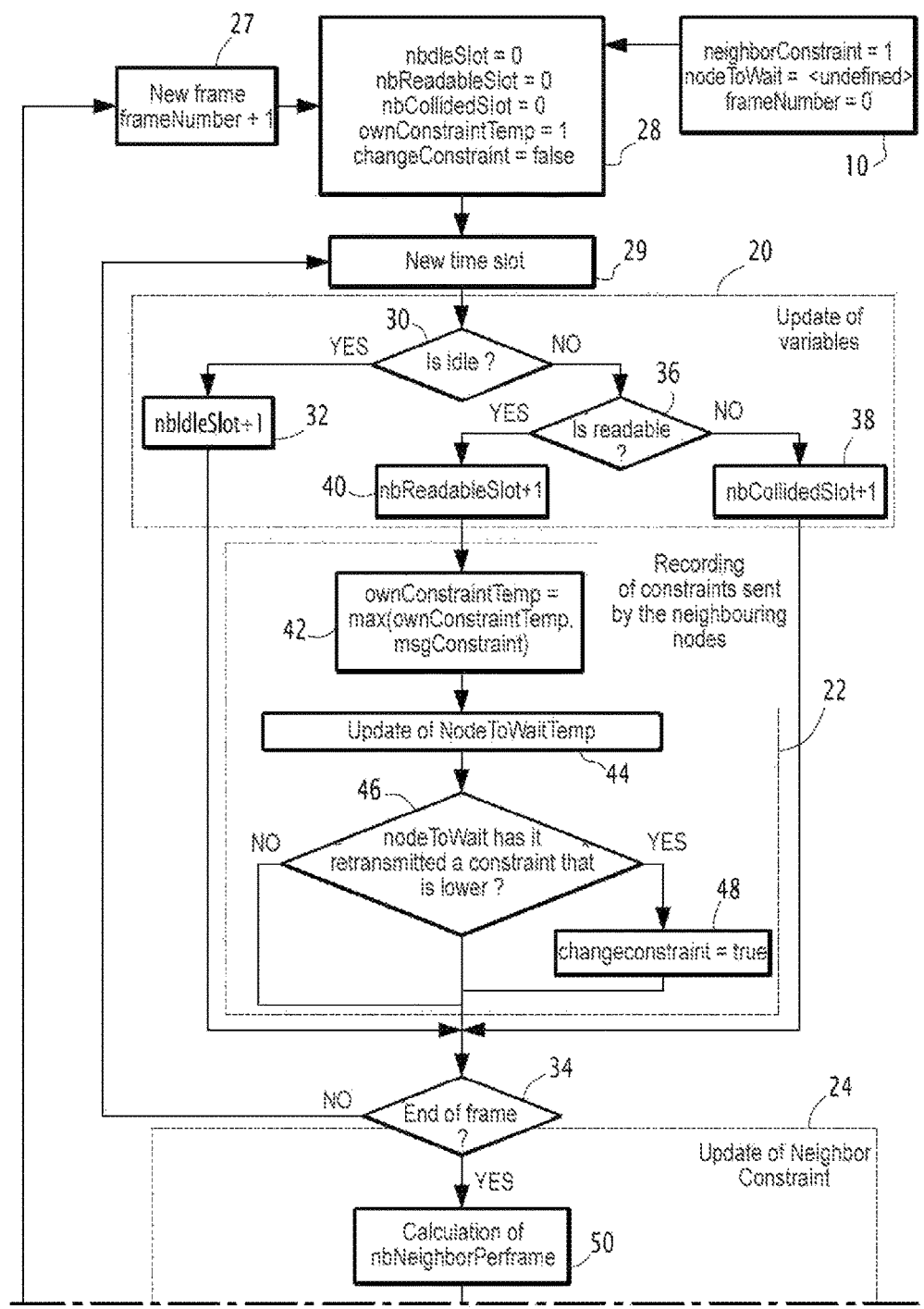
FIG. 2 is a flow chart of a collision reduction algorithm for reducing collisions used by the method according to the invention.
Figure 2B:
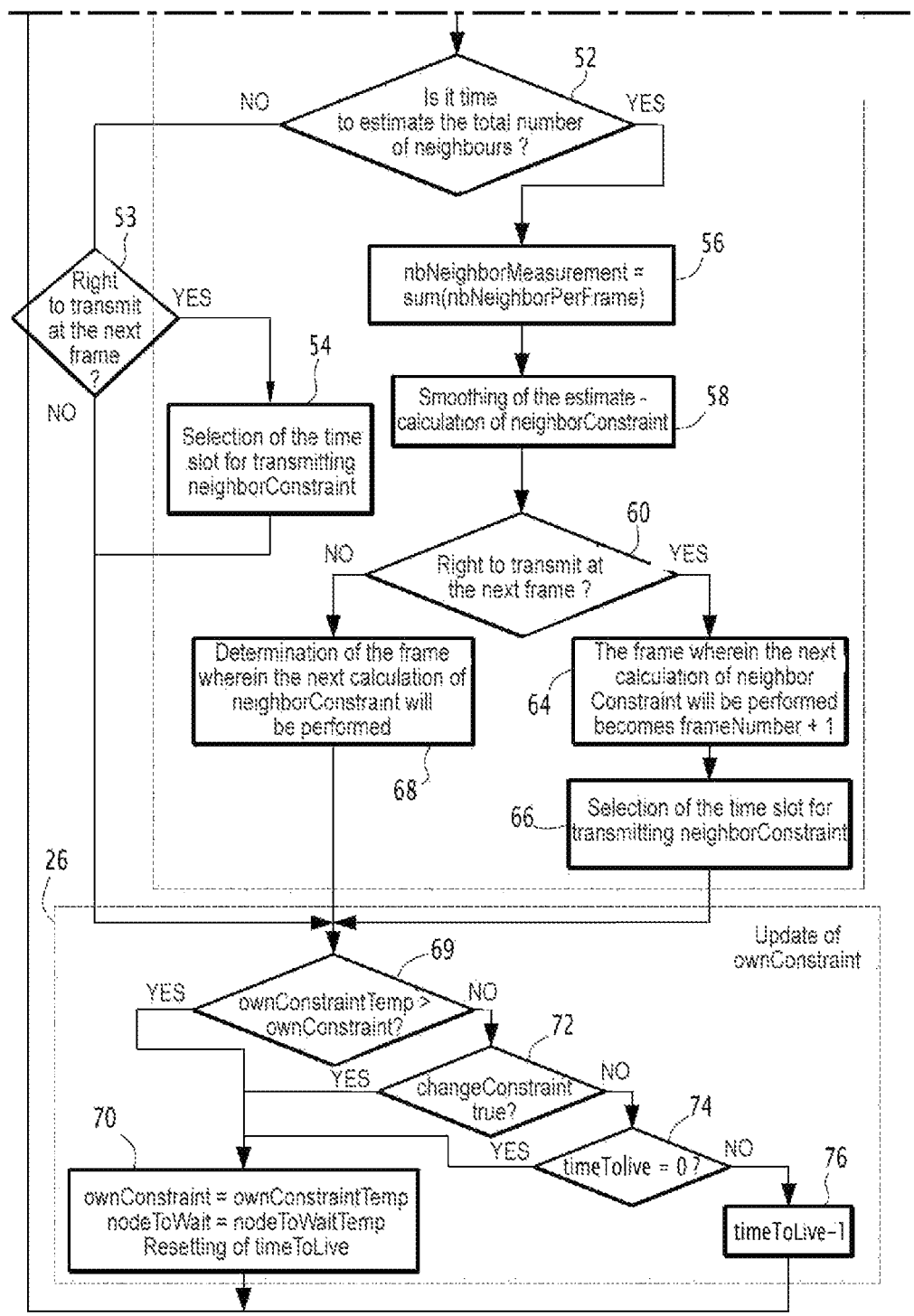

Each node is capable of implementing on a continuous basis the algorithm represented in FIG. 2. This algorithm is implemented for each new frame received by the node considered.

In order to enable the implementation of the algorithm, with a view to reducing the number of collisions, the variables contained in the following two fields are added to each message sent in a time slot of the message transmitted by the node:

msgConstraint which represents a constraint imposed by the transmitting node on each of its neighbouring nodes; and .ownConstraint which represents the constraint that the transmitting node imposes on itself in accordance with the constraints that are imposed on it by the neighbouring nodes.

A node that is subject to a constraint ownConstraint has the right to transmit a message having a low priority level in all the ownConstraint frames per cycle, and it has to forego the transmitting of messages having a low priority level in the other frames of the cycle.

A cycle consists of a variable whole number of successive frames. A node has an available opportunity to transmit one low priority level message per cycle.

The algorithm thus provides for the definition of the constraint specific to each node, which amounts to distributing the nodes into groups, with each group being associated with frames, and only the nodes of the group associated with a given frame having the right to transmit messages having a low priority level in that frame. The algorithm thus reduces the risks of collision.

This constraint ownConstraint is determined by each node for itself in accordance with the constraints msgConstraint that are imposed on it by the neighbouring nodes.

Thus, each node:

Estimates the number of neighbouring or interfering nodes transmitting in its neighbourhood on the basis of the number of slots received correctly, collided slots and idle slots;

Calculates the probability of collision in its neighbourhood;

Calculates a constraint to be imposed on its neighbouring nodes in order to reach a threshold probability of collision;

Subjects itself of its own accord, to the constraints imposed by its neighbouring nodes;

A phase of initialisation 10 precedes the execution of the algorithm. During this phase certain status related variables are initialised:

neighbourConstraint is an integer representing the constraint imposed by the considered node on each of its neighbour nodes, initialised to the value 1;

nodeToWait is the identifier of the sender node transmitting the constraint to which the considered node is subjected, initialised to the value "undefined";

frameNumber is the number of the current frame, initialised to zero.

More precisely, the algorithm consists of four major phases 20, 22, 24 and 26 illustrated in FIG. 2 corresponding respectively to an estimation of the number of neighbours and interfering nodes transmitting in a frame, during the phase 20, the recording of the constraints sent by the neighbours over the course of a frame, during the phase 22, an updating, under certain conditions, of the constraint to be imposed on its neighbouring nodes, during the phase 24, and an updating, under certain conditions, of the constraint to which the node is subjected over the course of a frame, during the phase 26.

The two first phases 20, 22 are carried out at each new time slot while the last two phases 24, 26 are carried out at each end of frame.

The phase 20 consists of an updating of the variables containing the number of idle slots, readable slots and collided slots for the node considered upon its receiving the relevant information items for a new time slot. These variables will enable it subsequently to estimate the number of nodes that have transmitted in its neighbourhood at the end of the frame.

The phase 22 is carried out only if the time slot currently in progress is readable. It consists of the recording of the constraints sent by the transmitting neighbour node of the node considered.

The phase 24 consists of the calculation of the total number of neighbouring or interfering transmitter nodes of the node considered, based on the variables updated during the phase 20 and under certain conditions, the determination of the distribution rule to be imposed on the neighbouring nodes of the node considered, taking into account the number of estimated neighbouring or interfering transmitter nodes.

Finally, the phase 26 consists of an updating of the distribution rule to which a node must be subjected.

The same algorithm is implemented on a continuous basis by each node of the network.

The application of the algorithm shown in FIG. 2 for a node of an ad hoc network is considered here.

This algorithm is implemented for each new frame whose reception begins at the step 27 over the course of which the variable frameNumber is incremented by 1.

The variables used by the algorithm are first initialised for each new frame during a step 28, in the following form:

nbReadableSlot=0, nbCollidedSlot=0 and nbIdleSlot=0, ownConstraintTemp=1 and changeConstraint="false" for the node considered, these variables satisfying the following definitions:

nbReadableSlot is the number of time slots that are readable in a frame. A time slot is readable if a message has been received, that is to say, if exactly one neighbour node of the node considered has attempted to access the time slot.

nbCollidedSlot is the number of time slots over the course of a frame in which collisions have occurred. A time slot is a collided slot if at least two neighbouring or interfering nodes of the node considered have sent a message over this slot.

nbIdleSlot is the number of idle (free) time slots in a frame. A time slot is idle if no neighbouring or interfering node has sent a message over this slot.

ownConstraintTemp is the highest constraint received from the neighbouring nodes of the node considered during the frame currently in the process of reception. A distribution rule imposes on the nodes that are subjected thereto the requirement to transmit messages having a low priority level only once every q frames, q being known as the constraint. ownConstraint is the constraint q to which the node considered is subjected at a given time instant, which may be different from ownConstraintTemp, and changeConstraint is a boolean taking the value "true" if the constraint ownConstraint is to be updated.

The phases 20 and 22 are implemented for each new time slot of the frame received during the step 29.

The phase 20 starts upon reception of the message contained in the new time slot through a first step 30 consisting of determining whether this time slot is idle or not.

If the slot is idle, the variable nbIdleSlot is incremented by one unit during a step 32 and the process proceeds directly to the end of the phase 22, where it is determined during a step 34 whether the frame determined during the step 27 has concluded or not. If it has not concluded, the considered node must process the information and data contained in a new time slot detected during the step 29. Otherwise the phase 24 is implemented.

If the slot is not idle during the test of the step 30, during a step 36, it is determined whether the slot is readable or not.

If the slot is not readable the variable nbCollidedSlot is incremented by one unit during a step 38 and the process proceeds directly to the step 34 at the end of the phase 22.

If the slot is readable the variable nbReadableSlot is incremented by one unit during a step 40 and the process then goes to the phase 22.

The phase 22 is therefore carried out only if the time slot currently in progress is readable.

This phase starts with a step 42 during which the node compares the constraint received, represented by the variable msgConstraint, with the variable ownConstraintTemp which is the highest constraint received from the neighbouring nodes of the node considered during the frame currently in the process of reception. The highest constraint between the constraint received msgConstraint and the variable ownConstraintTemp, which until then is the highest, is recorded in the variable. ownConstraintTemp.

During the subsequent step 44, the identifier of the node that is transmitting this highest constraint is recorded in a variable nodeToWaitTemp.

The step 46 consists of verifying whether the node nodeToWait that has transmitted over the course of the preceding frames the constraint msgConstraint to which the node considered is subjected, has retransmitted a lower constraint. If this is not the case, the process proceeds to the step 34, otherwise the variable changeConstraint takes the value "true" during a step 48 and then the process proceeds to the step 34.

The phase 24 starts with a step 50 of calculating the number of neighbouring or interfering nodes that have transmitted in the frame that has just been received, this number is saved and stored in a table nbNeighbourPerFrame indexed by the number of the current frame modulo neighbourConstraint. In the subsequent sections, by way of reducing the amount of notation the index has been omitted. In order to perform the calculation, use is made of the equation:

$$nb\text{NeighbourPerFrame} = nb\text{ReadableSlot} + k \cdot nb\text{CollidedSlot with } k \geq 2 \quad (1)$$

The coefficient k is first of all set upon the initialisation of the network based on the average number of neighbouring or interfering nodes per node and the number of time slots in a frame. Then its value can be changed dynamically in order to better reflect the local topology of the network around the node considered.

The examples that follow illustrate the selection of the coefficient k.

Figures 3, 4:
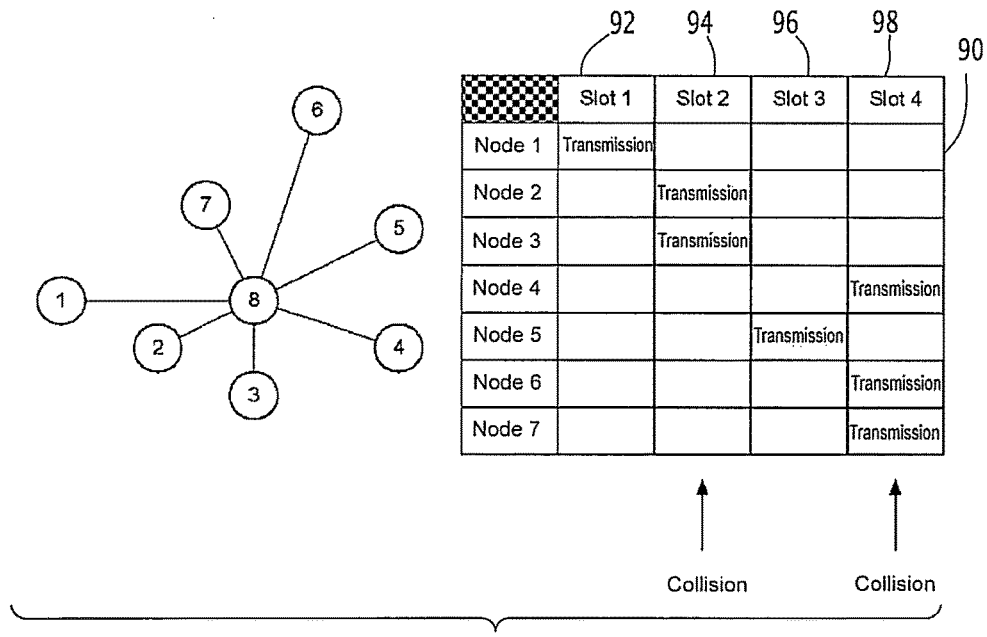

In FIG. 3, an ad hoc network is composed of eight nodes numbered from 1 to 8. A node 8 is listening for messages sent by the nodes in its neighbourhood and seeks to estimate its number of neighbouring or interfering transmitter nodes. A table 90 represents a frame divided into four time slots 92, 94, 96 and 98, during which the nodes numbered from 1 to 7 transmit messages. By analysing the messages received over this frame, the node 8 detects a collision during the time slots 94 and 98; as for the two time slots 92 and 96, they are indeed readable. An estimation of the number of neighbouring or interfering nodes that have transmitted in the frame consists of applying the relation (1). In the example shown in FIG. 3, the variables nbReadableSlot and nbCollidedSlot amount to two. By choosing k=2, the node 8 is estimated to have six neighbours.

In FIG. 4, a frame 100 is divided into five time slots 101, 102, 103, 104 and 105. Seven nodes, numbered from 1 to 7, transmit messages in this frame. The ratio between the number of nodes and the number of time slots then amounts to 1.4. An ideal k is calculated to be equal to the number of colliding messages divided by the number of time slots over which the collisions occur. In FIG. 4, there are four messages 106, 107, 108 and 109 that happen to collide, these collisions occurring over the course of two time slots 102 and 105. The ideal k takes as value 2.

In FIG. 5, a frame 120 is divided into four time slots 121, 122, 123 and 124. Seven nodes, numbered from 1 to 7, transmit messages in this frame. The ratio between the number of nodes and the number of time slots then amounts to 1.75. In FIG. 5, there are five messages 125, 126, 127, 128 and 129 that happen to collide, these collisions occurring over the course of the two time slots 122 and 124. The ideal k takes as value 2.5.

In FIG. 6, a frame 140 is divided into five time slots 141, 142, 143, 144 and 145. Ten nodes, numbered from 1 to 10, transmit messages in this frame. The ratio between the number of nodes and the number of time slots then amounts to 2. In FIG. 6, there are five messages 146, 147, 148, 149 and 150 that happen to collide, these collisions occurring over the course of the two time slots 142 and 145. The ideal k takes as value 2.6.

FIGS. 4, 5 and 6 show evidence of the fact that the higher the ratio between the number of nodes and the number of time slots in a frame, the higher will be the ideal factor k.

During the beginning of phase 24, the node considered imposes for the moment on the neighbouring nodes a distribution rule whereof the value of the constraint is saved and stored in a variable neighbourConstraint.

The estimation of the total number of neighbouring or interfering transmitter nodes of the node considered which subsequently enables the possibility of determining the new constraint to be imposed on the neighbouring nodes is done over the last Q=neighbourConstraint frames, by adding the neighbourhoods estimated in each of the Q frames.

To this end, during a step 52, visible in FIG. 2, the node determines whether it is the last estimation prior to being able to estimate the total number of neighbouring or interfering transmitter nodes and calculating the new constraint to be imposed on the neighbouring nodes.

If it is not the last estimation and if the node has the right to transmit at the next frame, which is verified during a step 53, the considered node selects in random manner, during the step 54, a time slot for transmitting in the subsequent frame the relevant useful information and data as well as the constraints, msgConstraint which takes the value of neighbourConstraint and ownConstraint. During the step 53 the node determines whether it has the right to transmit low priority level messages by ascertaining whether it belongs to the group that this right, the different nodes of the network being distributed into groups in accordance with a distribution rule. For example, a node subjected to a constraint ownConstraint has the right to transmit a constraint for its neighbourhood in the subsequent frame if and only if its modulo MAC address ownConstraint is equal to the number of the subsequent modulo frame ownConstraint, that is to say, mod(@MAC,ownConstraint)=mod(frameNumber, ownConstraint).

If it is not the last estimation and if the node considered does not have the right to transmit low priority level messages, the process proceeds directly to the end of the phase 24.

If this is the last estimation, in a step 56, the process saves and stores in a variable nbNeighbourMeasurement the sum of the numbers of neighbouring or interfering transmitter nodes estimated in each of the Q frames that is to say the sum of all the nbNeighbourPerFrame. In a subsequent step 58, a smoothing is performed of the estimate of the total number of neighbouring nodes nbNeighbourEstim by weighting the value estimated at the current frame by that estimated at the preceding frame according to the following relationship:

$$nb\text{NeighborEstim} = \alpha * nb\text{NeighborEstim} + (1-\alpha) * nb\text{NeighborMeasurement} \quad (2)$$

where nbNeighbourEstim is a variable initialised at the beginning of the execution of the algorithm to zero or another value if the total number of neighbours in the ad hoc network is initially known at the outset, and α a weighting coefficient for example equal to 0.8.

The smoothing of the estimate of the neighbourhood provides the ability to avoid changes in constraint upon each error.

During this same step 58, the node calculates the new constraint neighbourConstraint to be imposed on the neighbouring nodes.

The value of the constraint neighbourConstraint to be imposed on the neighbouring nodes based on the estimated neighbourhood is established as follows.

Let n be the number of time slots in a frame. Let N be the number of transmitter nodes in the neighbourhood at one hop from the listening node (more interfering neighbours).

In the example provided, the assumption is that all the nodes in the neighbourhood of the listening node should transmit one message at each frame. The probability of the listening node receiving, without occurrence of collision, the message from one of its neighbouring nodes over the course of a frame is written as follows:

$$\overline{p_{\text{collision}}}(S) = (1-1/n)^{N-1} \quad (3).$$

A probability $P_{Threshold}$ is established for example equal to 0.8 corresponding to the minimum probability of the neighbours of the listening node having to make themselves be heard by the listening node.

The maximum number of neighbouring and interfering nodes transmitting over a same given frame and able to surround the listening node in order to not exceed $P_{Threshold}$ is given by the following equation:

$$M = 1 + \ln(P_{Threshold}) / \ln\left(1 - \frac{1}{n}\right) \quad (4)$$

In the event of the number of the neighbouring and interfering nodes, denoted P, estimated by the listening node being greater than M, the neighbouring nodes should then be divided into Q groups transmitting one message having a low priority level once every Q frames, with:

$$Q = \lfloor P/M \rfloor + 1 \quad (5)$$

with $\lfloor x \rfloor$ which represents the integer part of x.

The value of P is equal to nbNeighbourMeasurement.

Q is known as the constraint and the value of neighbourConstraint is taken to be equal to Q.

The $q^{-th}$ group (with 1<q<Q) is formed by neighbouring nodes whose modulo MAC addresses Q are equal to q−1 and transmit low priority level messages at each frame whereof the modulo number Q is equal to q−1. The estimation of the number of neighbouring and interfering nodes should thus be done every Q frames, by adding the neighbourhoods estimated during each of the Q frames.

In the event of the number of the neighbouring and interfering nodes estimated by the listening node being less than M, the neighbouring nodes may then continue to transmit messages having a low priority level at each frame. It is then necessary to fix/set Q=1.

Figure 7:
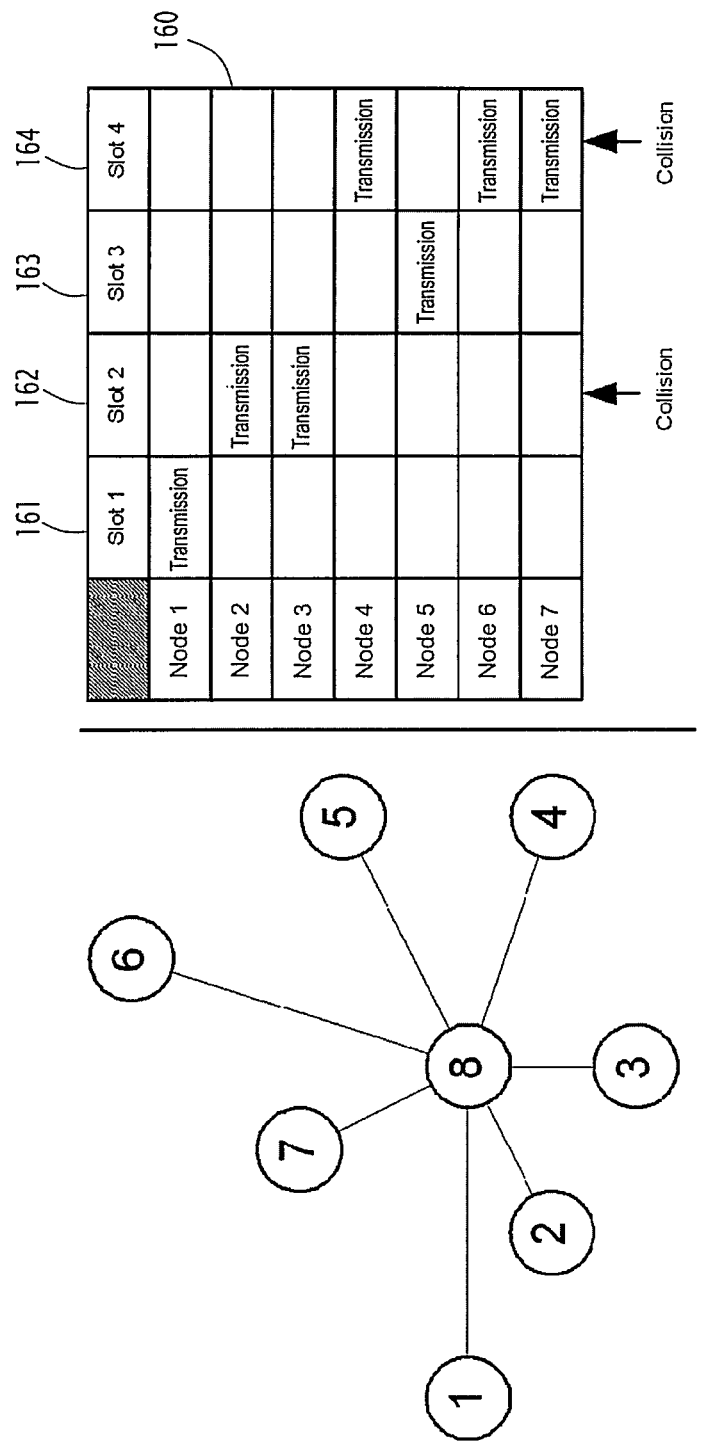
FIGS. 7, 8, 9 and 10 are schematic views of an example of application of the algorithm for reducing collisions used by the method according to the invention.

In FIG. 7, an ad hoc network is composed of eight nodes numbered from 1 to 8. A node 8 is listening for messages sent by the nodes in its neighbourhood or by interfering nodes. In this figure, a frame 160 is divided into four time slots 161, 162, 163 and 164. It is then necessary to set k=2 and $P_{Threshold}$=0.70. Applying the formula of equation (4), yields M=2.23. The node 8 not knowing the number of neighbouring nodes that surround it, imposes the constraint Q=1 on its neighbouring nodes. These latter, being 7, therefore have a probability of identification of 0.18, according to the equation (3). It is assumed that the neighbouring nodes of node 8 have transmitted messages as represented in the table 160. By applying the formula of equation (1), knowing that there are two readable time slots, two colliding time slots and that k=2, the node 8 estimates six neighbours.

The node 8 calculates the constraint to be sent to its neighbouring nodes based on the equation (5), which amounts to Q=3. By assuming that the number of the first frame during which the nodes must be subjected to the constraint imposed by the node 8 is 1, the nodes 1, 4 and 7 will be able to transmit during the frame 1, the nodes 2 and 5 will transmit during the second frame and the nodes 3 and 6 will transmit during the third frame.

Figure 8:
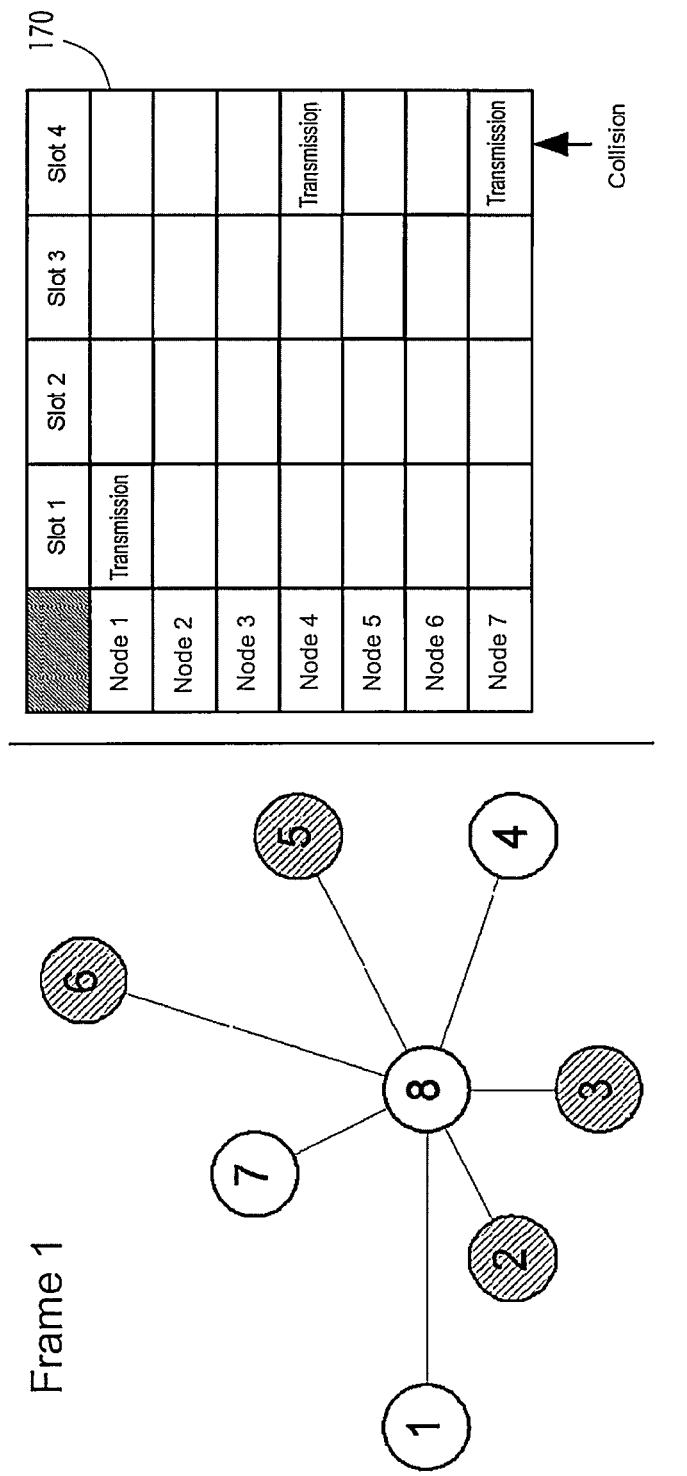

In FIG. 8, only the nodes 1, 4 and 7 transmit during the frame 1, represented by the table 170. The probability of there being no collision is then 0.56, in accordance with the equation (3).

Figure 9:
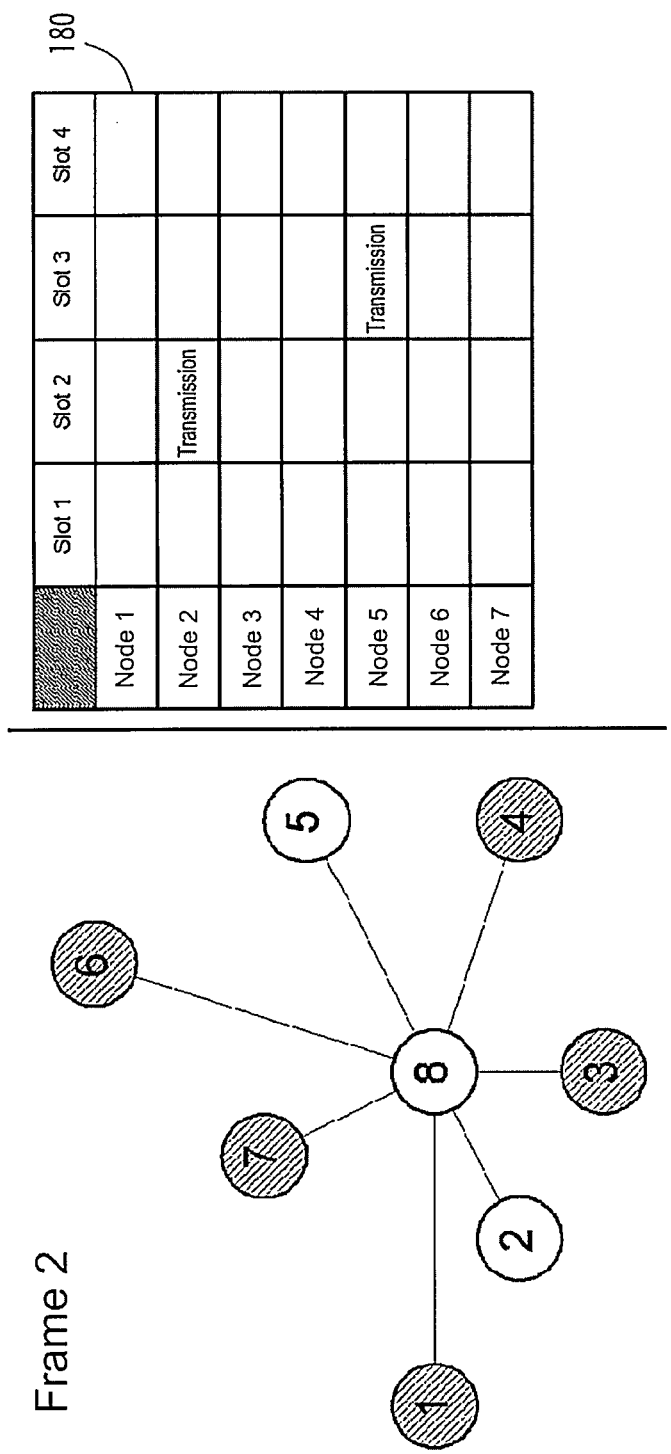

In FIG. 9, only the nodes 2 and 5 transmit during the frame 2, as represented by the table 180. The probability of there being no collision is then 0.75, in accordance with the equation (3).

Figure 10:
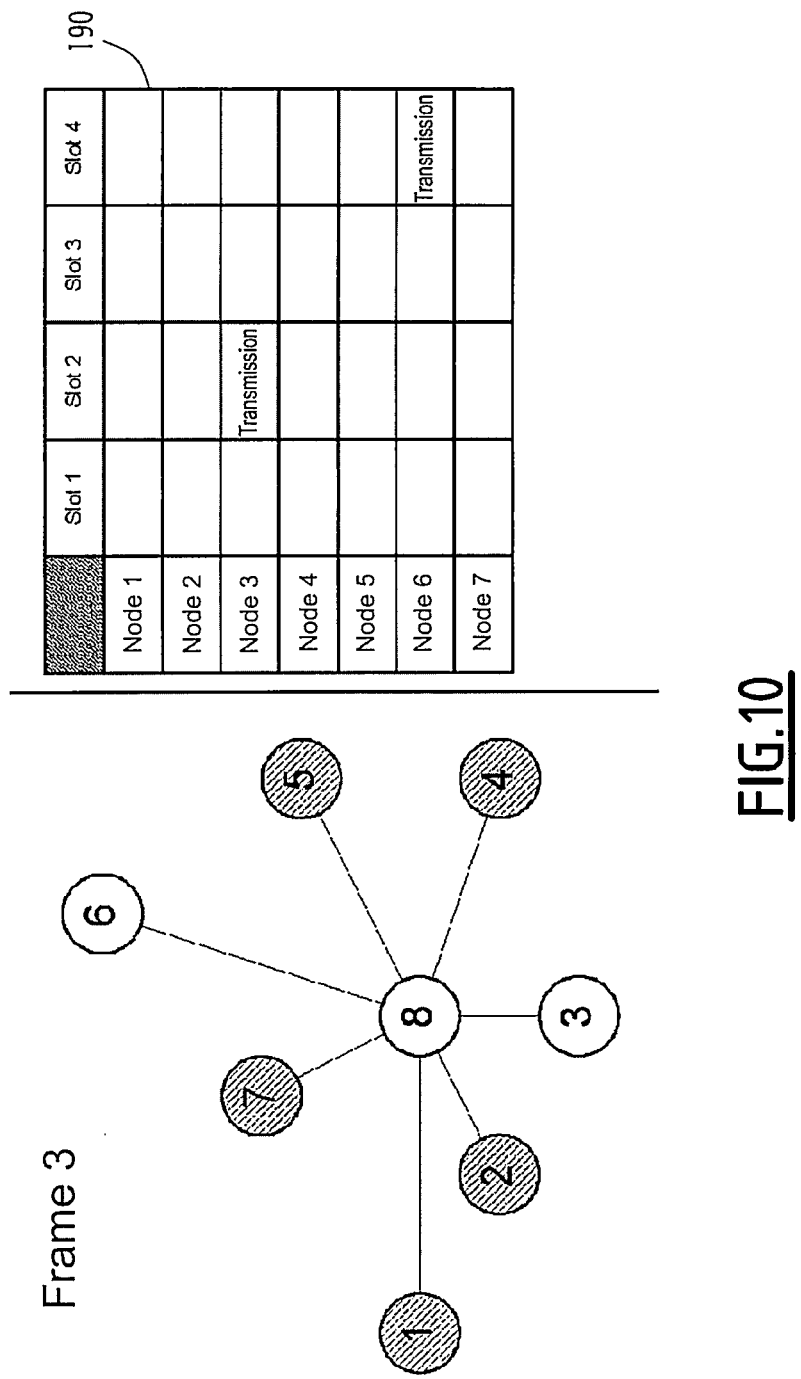

In FIG. 10, only the nodes 3 and 6 transmit during the frame 3, represented by the table 190. The probability of there being no collision is then 0.75, in accordance with the equation (3). The constraint imposed by the node 8 being equal to 3, the subsequent estimation of the number of neighbouring nodes is done at the end of the frame 3 where it is estimated that:

$$nb\text{NeighbourMeasurement} = \underbrace{1 + k*1}_{Frame1} + \underbrace{2 + k*0}_{Frame2} + \underbrace{2 + k*0}_{Frame3} = 7 \text{ neighbours}.$$

The new constraint neighbourConstraint to be sent to the neighbouring nodes is calculated by using the equation (5), it amounts to Q=4. The algorithm then continues with this new constraint.

In a step 60, the node determines whether it has the right to transmit the new constraint in the subsequent frame in accordance with the same treatment processing as in the step 53.

If the considered node has the right to transmit in the subsequent frame, the process proceeds to the step 64, which consists of calculating the number of the frame at the end of which the node considered is to determine the next constraint neighbourConstraint that it will impose on its neighbouring nodes: that is the subsequent frame (frameNumber+1).

During a step 66 the considered node chooses in a random manner a time slot for transmitting in the subsequent frame the relevant useful information and data as well as the new constraints msgConstraint (which takes the value of neighbourConstraint) and ownConstraint.

If the node considered does not have the right to transmit in the subsequent frame, during a step 68, the node considered calculates the number of the frame at the end of which it is to determine the next constraint neighbourConstraint that it will impose on its neighbouring nodes. There are two cases: (1) if the constraint has just been transmitted then the next calculation of neighbourConstraint will be done Q frames later: frameNumber+Q; (2) otherwise the next calculation of neighbourConstraint will be done at the subsequent frame: frameNumber+1.

The phase 24 is thus concluded with step 66 or 68.

In the phase 26, the constraint to which a node considered must be subjected is determined. The mechanism for updating of ownConstraintTemp described in step 42 ensures the application of the basic principle according to which a node receiving several constraints from its neighbouring nodes submits to the strongest, which amounts to adopting the lowest frequency of transmission.

Figure 11:
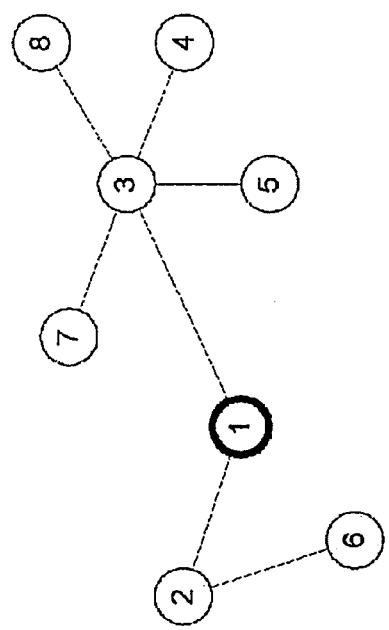

In FIG. 11, an ad hoc network is composed of eight nodes numbered from 1 to 8. It is assumed that the neighbouring nodes 2 and 3 of the node 1 have transmitted constraints over the course of a frame such as represented in Table 191. According to this basic principle, the node 1 will be subjected to the constraint transmitted by the node 3, that is to say, Q=4.

The neighbour of the considered node sending the strongest constraint may itself be subjected to a constraint by one of its neighbours. It will thus not be able to send its constraint at each frame. The nodes being subjected to its constraint should nevertheless not be subjected to weaker constraints when they do not receive its constraint.

Figure 12:
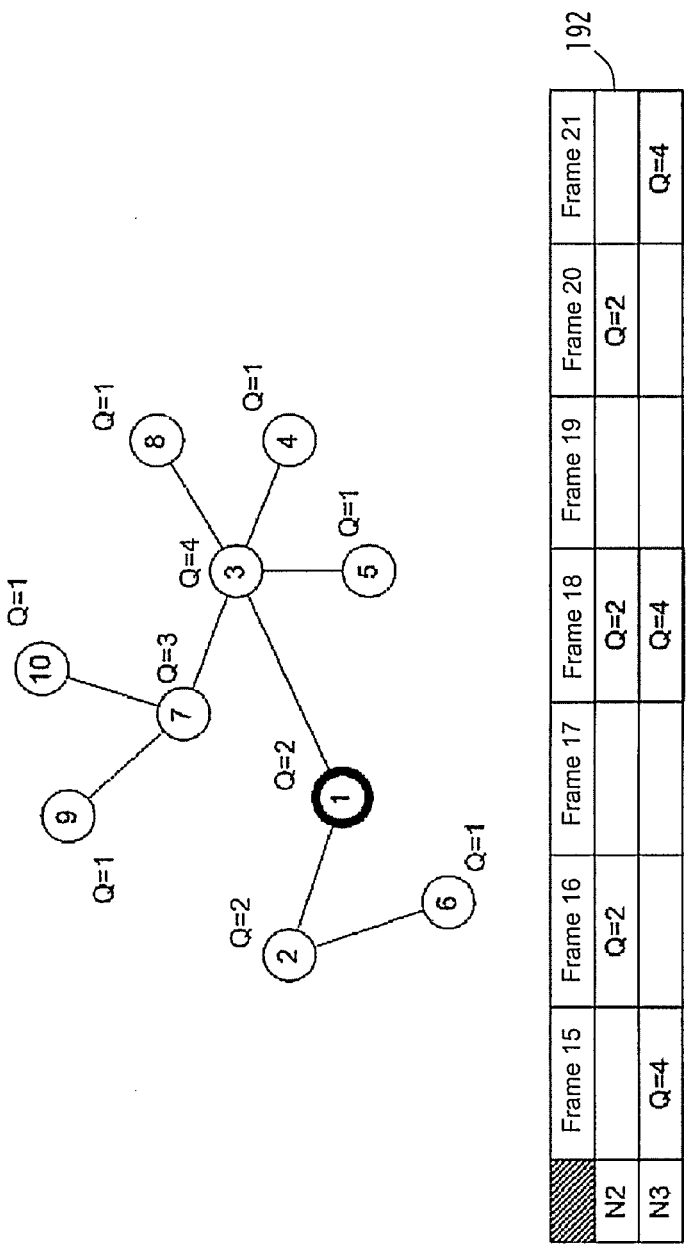

In FIG. 12, an ad hoc network is composed of ten nodes numbered from 1 to 10, with for each node the constraints imposed on the neighbouring nodes. A table 192 represents the constraints received by the node 1 over the course of seven consecutive frames, numbered from 15 to 21. In this example, the node 3 sends the constraint Q=4 over the course of the frame 15. Being itself subject to the constraint q=3, it will be able to transmit only at the frames 18 and 21. According to the basic principle during the course of the frames 16 to 21 the node 1 is to be subjected to the constraint q=4. If this basic principle is not complied with, the number of neighbours will be overestimated by the node 3, being the sender transmitting the maximum constraint, and the algorithm will diverge with an estimate of the number of neighbours being infinite.

The phase 26 thus starts with a step 69 during which the considered node determines whether ownConstraintemp is higher than the constraint to which it is subjected ownConstraint.

If this is the case, the process proceeds to a step 70, during which the node determines its own constraint by assigning the value ownConstraintTemp to the variable ownConstraint and the value nodeToWaitTemp to the variable nodeToWait. Simultaneously, the counter timeToLive is reset to a certain value, for example twice the value of the constraint to which the node considered is subjected. This counter is used to determine whether a node has not transmitted since a long time.

If, during the step 69, the variable ownConstraintemp is not higher than the constraint to which it is subjected ownConstraint, a comparison is done of the variable changeConstraint to "true" during a step 72.

If it is equal to "true", that is the case where the node that is transmitting the constraint to which the node considered is currently subjected, has transmitted a weaker constraint, the process proceeds to the step 70. Otherwise the process proceeds to a step 74 during which the value of timeToLive is examined. If timeToLive reaches the value 0, then it is considered that the node is probably no longer in the neighbourhood of the node considered. In the step 74 it is tested whether the counter timeToLive of the node that has transmitted the constraint to which the node considered is subjected is nil or not. If timeToLive is zero then the process proceeds to the step 70, otherwise the process proceeds to a step 76 during which the counter TimeToLive is decremented by one unit.

The steps 69, 72 and 74 prevent the divergence of the algorithm by imposing on the node considered the requirement to be subjected to the maximum constraint that it has received during a frame if and only if this maximum constraint is greater than the constraint to which it is subject or the node to which it submits has retransmitted a weaker constraint or the node to which it submits is probably no longer in its neighbourhood.

Figure 13:
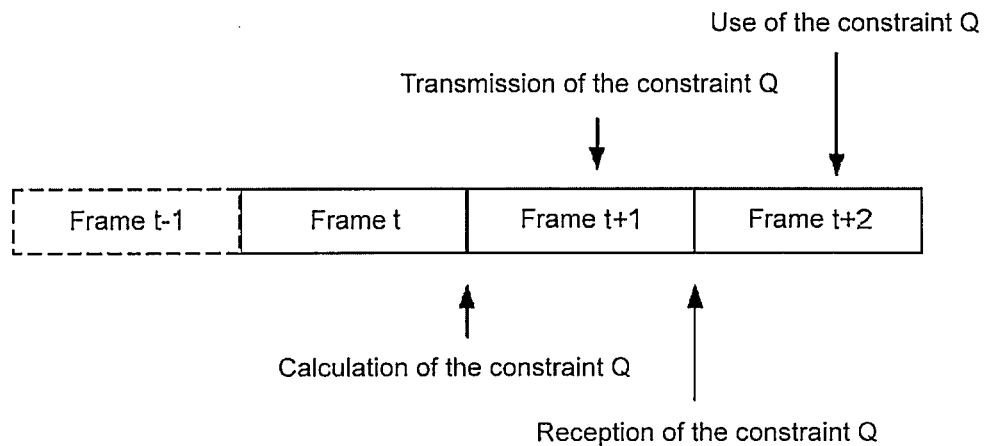
Figure 14:
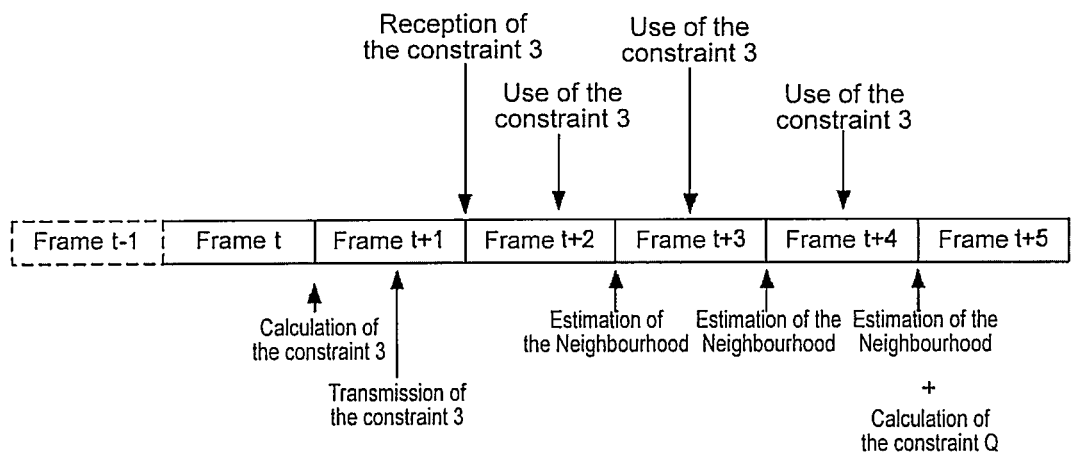
Figure 15:
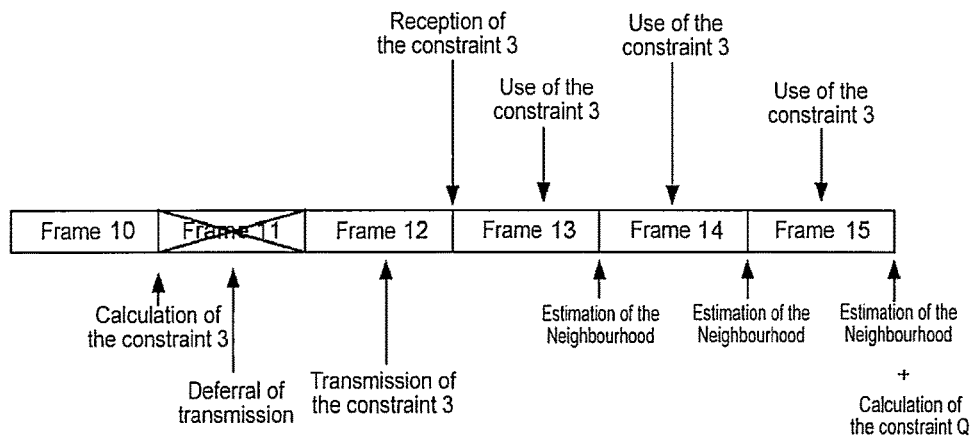

Explained in the FIGS. 13 to 15 are the time differences between the transmission and the application of constraints respectively by a transmitter node and by the receiver nodes.

In FIG. 13, a node calculates at the end of a frame t the constraint Q to be imposed on its neighbourhood. Assuming that the constraint q to which the node considered is subject permits it, it transmits the constraint Q to the neighbouring nodes in the subsequent frame t+1. The neighbouring nodes receiving this constraint will be subjected thereto starting from the frame t+2.

In FIG. 14, a node calculates at the end of a frame t the constraint Q to be imposed on its neighbourhood. In the example shown in FIG. 14, the constraint amounts to three. Assuming that the constraint q to which the node considered is subject permits it, this latter transmits the constraint at the frame t+1, the neighbouring nodes are subjected thereto at the frame t+2. The node considered begins its estimations of the neighbourhood starting from the end of the frame t+2. The next calculation of the constraint is performed at the end of the frame t+2+Q−1, that is at the end of the frame t+4 in the example shown in FIG. 14, based on the estimations of the neighbourhood performed over the frames t+2, t+3, t+2+Q−1, that is over the frame t+2, t+3 and t+4 in the example shown in FIG. 14.

In FIG. 15, a node 2 calculates at the end of a frame 10 the constraint Q to be imposed on its neighbourhood. In the example shown in FIG. 15, the constraint amounts to three. The node considered is subjected to a constraint, which in this example prevents it from transmitting the constraint at the subsequent frame 11. There is a deferral of the transmission of the constraint to be imposed on the neighbouring nodes. Let v be the frame at which the listening node has the right to transmit the previously calculated constraint. Then the listening node is to postpone its next calculation of constraint to the frame v+Q based on estimations performed at the end of the frames v+1, v+2, v+Q. In the example shown in FIG. 15, v has the value 12, the listening node performs the calculation of the new constraint at the end of the frame 15 based on the estimations performed at the end of frames 13, 14 and 15. In this example of application of the algorithm, no estimation of the neighbourhood is performed at the end of the frame of transmission of the constraint, that is, at the end of the frame 12, and at the end of the frame of deferral of the transmission of the constraint, that is, at the end of the frame 11.

Figure 16:
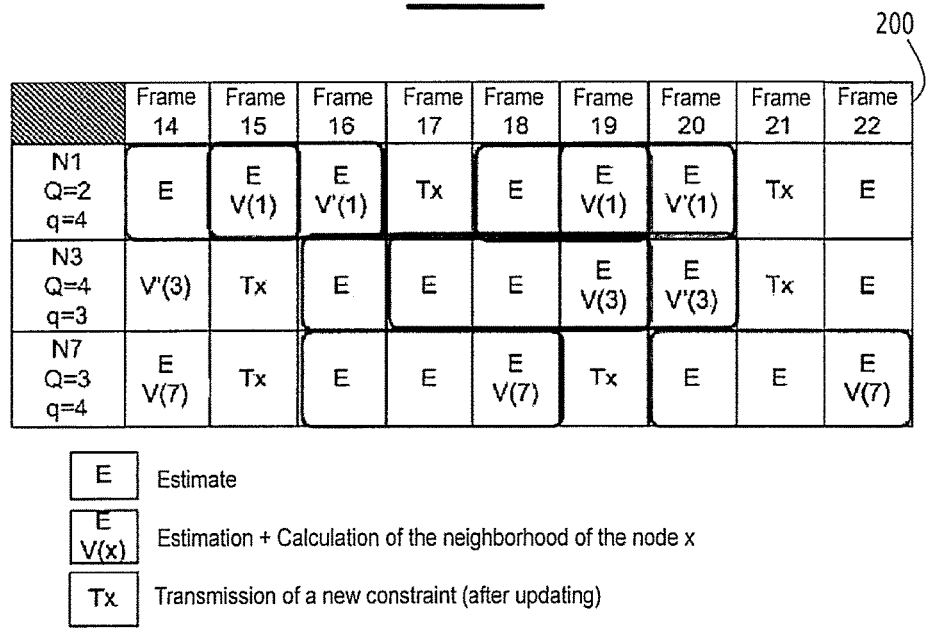

In FIG. 16, a table 200 presents a succession of frames numbered from 14 to 22, and three nodes N1, N3 and N7. The node N1 imposes on its neighbouring nodes a constraint Q=2 and is itself subjected to a constraint q=4. The node N3 imposes on its neighbouring nodes a constraint Q=4 and is itself subjected to a constraint q=3. The node N7 imposes on its neighbouring nodes a constraint Q=3 and is itself subjected to a constraint q=4. This example illustrates the manner in which the algorithm of the method takes advantage of the slots for deferral of transmission in order to estimate its neighbourhood and calculate the constraint. Following a deferral of transmission, the constraint Q calculated by a node called S is not sent to its neighbouring nodes. The neighbours of S therefore continue to use the same constraint as earlier. The nodes transmitting a message over the course of a transmission deferral frame T are, except in case of an error, for example due to a collision, the same as those transmitting at the frame T−Q. The algorithm of the method uses the estimate of the number of neighbouring and interfering nodes transmitting during the frame T in order to recalculate the neighbourhood of the node S. The different calculations of neighbourhood are weighted according to the equation (2). In the example shown in FIG. 16, the node N1 calculates at the end of the frame 15 its total neighbourhood V(1). The node N1 must wait for the frame 17 in order to transmit the new constraint. At the end of the frame 16, referred to as transmission deferral frame, a second calculation of the neighbourhood V'(1) takes place, on the basis of the estimations performed in frames 15 and 16, and V(1). V'(1) is used for the calculation of the new constraint to be transmitted in frame 17.

Figure 17:
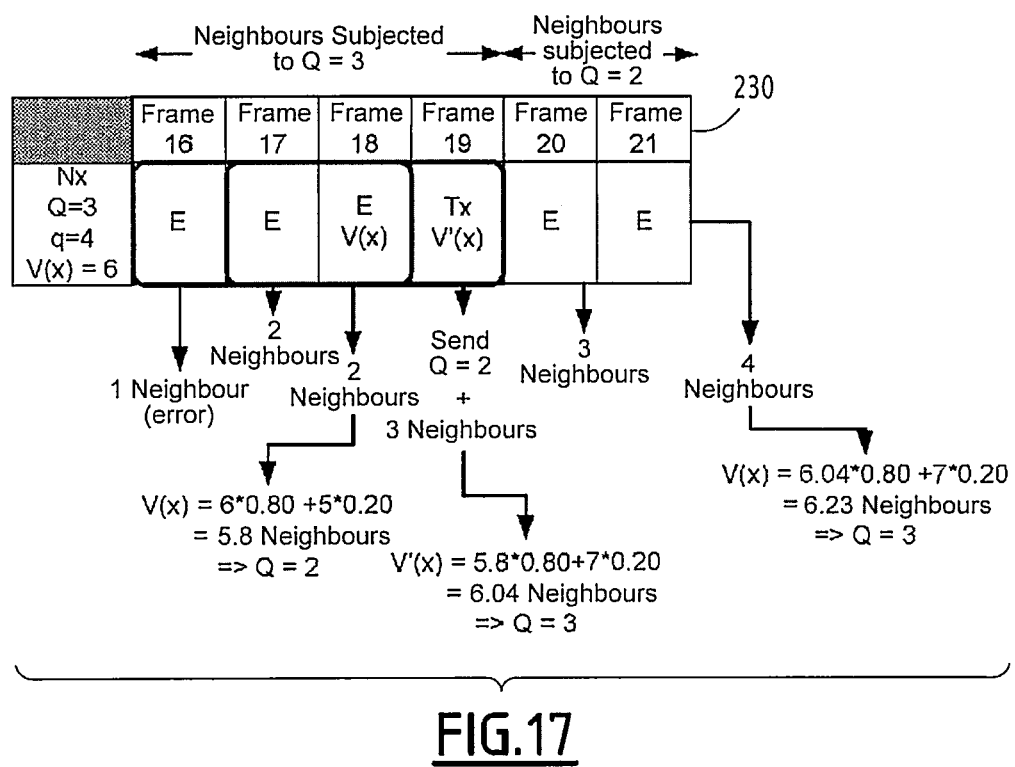

FIG. 17 illustrates one of the benefits of smoothing of the estimate of the number of neighbours and interfering nodes in the transmission slots. In this figure, a table 230 presents a succession of six frames numbered from 16 to 21, and a node Nx such that mod(x,4)=mod(15,4). The node Nx imposes a constraint Q=3 on its neighbouring nodes and is itself subjected to a constraint q=4. It is assumed that in the course of the frame 16 it commits an error in estimating that it has one neighbour instead of three, that in the course of the frame 17 it estimates that it has two neighbours, and that in the course of the frame 18 it estimates that it has two neighbours. It is assumed that it does not commit any error in the estimations of the number of neighbours that have transmitted in the frames 17 and 18. At the end of the frame 18, it estimates its total number of neighbours at five instead of seven, which leads it to impose a constraint Q=2 instead of Q=3 on its neighbouring nodes in frame 19, referred to as transmission frame. In the example shown in FIG. 17, the smoothing of the estimate is implemented in the algorithm of the method according to the invention. The constraint calculated in frame 19 will not be taken into account because the constraint calculated at the frame 18 has already been sent. In contrast, the number of neighbours calculated in frame 19 is taken into account in the calculation of the neighbourhood of the subsequent frames thanks to the smoothing of the estimate. Thus there is no loss of information associated with the transmission of a constraint in a frame. In this example, a smoothing of the estimate and the use of all the frames for performing the estimation are implemented by the algorithm, the estimation of the number of neighbours by a node is thus improved.

Because of the collisions, a node may not necessarily receive the maximum constraint to which it is to be subjected which may lead to a sharp variation in the number of neighbours estimated.

Preferably, a node sends the constraint that it imposes on its neighbouring nodes as well as the constraint to which it is itself subjected, in a manner such that its neighbours are able to determine whether their constraint has been received.

Figure 18:
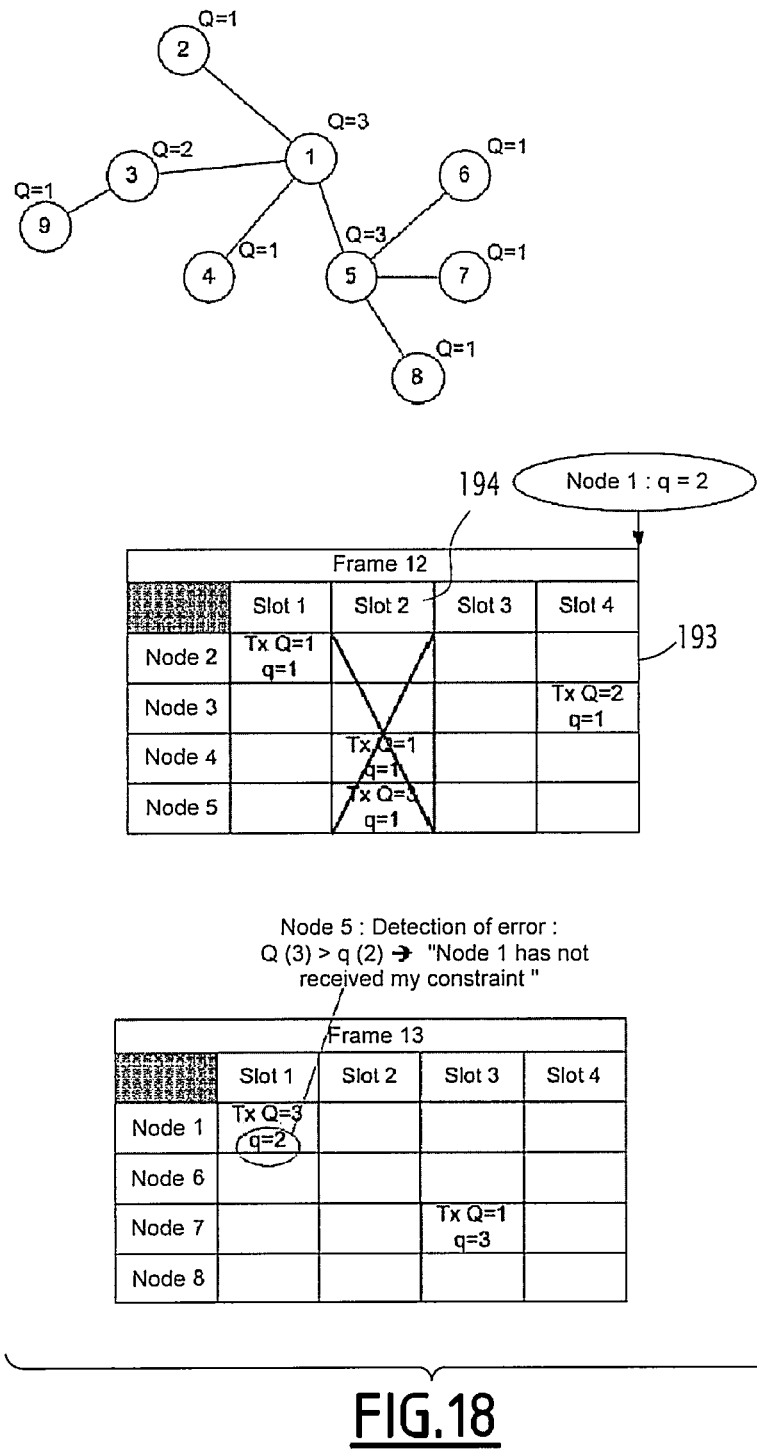

In FIG. 18, an ad hoc network composed of nine nodes numbered from 1 to 9. It is assumed that the nodes transmit messages in frames comprising of four time slots indicated as "slot" in the figure. In the course of a frame 11, it is assumed that all the nodes are subjected to a constraint q=1. At the end of the frame 11, each node of the network calculates the constraint Q, which it will impose on its neighbouring nodes. These constraints are transmitted in frame 12 and shown in FIG. 18. They will be used starting from the frame 13. A table 193 shows the messages received by the node 1 in the course of the frame 12. In the messages sent by a node, q denotes the constraint to which it is subjected and Q the constraint that it imposes on its neighbouring nodes. During the time slot 194, there is collision between the messages sent by the nodes 4 and 5. The node 1 is thus subjected to the maximum constraint that it receives, that is to say, Q=2, transmitted by the node 3. Of interest during the frame 13, are the messages received by the node 5, being the node that sent the highest constraint during the preceding frame. The node 1 transmits both the constraint that it imposes on its neighbouring nodes as well as the constraint to which it is subjected. Thus, the node 5 knows that the node 1 is subjected to a lower constraint than the one that it has imposed. The node 5 is thus capable of detecting the error. This solution presents the advantage of a node being able to determine in certain cases that its estimation of neighbours will be erroneous and therefore not proceeding to update this estimate.

In the second solution, a node knows the identity of the sender of the message that it receives.

In FIG. 19 the same ad hoc network as shown in FIG. 18 is considered. The same collision during the frame 12 occurs. The node 1 is therefore subjected to a constraint q=2. The node 5 that sent the constraint Q=3 in frame 12, estimates its neighbourhood over the frames 13 to 15. The Table 195 shows the messages received by the node 5 over the course of these three frames 13, 14 and 15. In frame 15, the node 1 transmits a second message in the period of estimation of the neighbourhood of the node 5. By comparison of the identifiers of the transmitter nodes, the node 5 detects this double despatch and does not take it into account.

This solution presents the advantage of a node being able in certain cases to detect whether a neighbouring node transmits more than one message during a period of estimation, and of then counting the neighbour node only once. Unlike the first solution that provides for only the detection of an error, this solution provides that ability, if the error is detected, to correct it. However the first solution has the advantage of detecting the error from the moment where one of the messages of the node that committed the error, is received correctly while the second solution can detect the error only if the two messages of the node that committed the error, are received correctly. It is possible to implement in the algorithm of the method according to the invention one or the other of these solutions or indeed to combine the two in order to benefit both from a maximum of errors detected as well as the possibility of correcting some of them.

The method according to the invention thus provides the ability to reduce the number of collisions without adjusting the size of the frames, it is in effect usable with a frame of fixed size. The method also does not require the despatching of additional signaling messages for example beacon messages. Only two additional fields are added to the messages transmitted by the nodes.

In addition, each of the nodes is capable of transmitting messages having a high priority level to its neighbouring nodes in a time slot defined in accordance with the same rules as those described here above for the messages having a low priority level.

According to the invention, and notwithstanding the algorithm of FIG. 2, in order to increase the probability of reception of a high priority level message, the method increases the number of transmissions of the message having a high priority level as compared to the number of transmissions of any message having a low priority level, in a same cycle.

Figure 20:
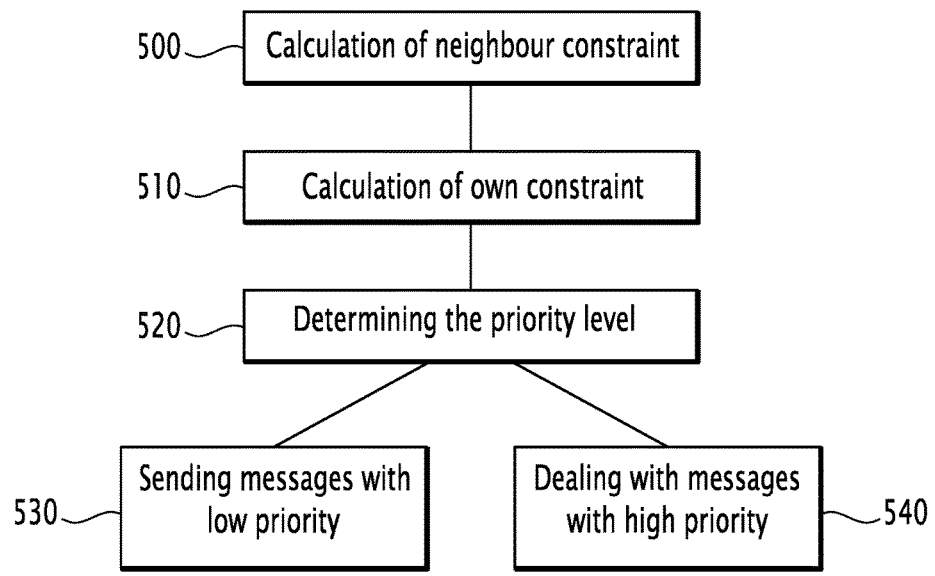
FIG. 20 is a flow chart of the method according to the invention.

When a node has a message to be transmitted to neighbouring nodes, it applies the method the algorithm for which is shown in FIG. 20.

During a first step 500, whether the message is of a high priority level or of a low priority level, the node calculates the constraint neighbourConstraint that it is to transmit to the neighbouring nodes, according to the algorithm of FIG. 2.

During a second step 510, the node calculates the constraint ownConstraint that it is to comply with according to the algorithm of FIG. 2, depending on the constraints neighbourConstraint received at the preceding frame from the neighbouring nodes.

The nodes for which the modulo MAC addresses ownConstraint are equal form a group. The nodes of this group are subjected to a constraint ownConstraint. They have the right to transmit a message having a low priority level only every ownConstraint frames. This set of frames constitutes a subset of predefined frames specific to the group.

In the second step 510, the node is distributed in a group in accordance with a distribution rule. The distribution rule is the calculation of the constraint ownConstraint.

During a third step 520, the node determines the priority level of the message that it seeks to transmit to the neighbouring nodes.

If the message that the node seeks to transmit to the neighbouring nodes is a message having a low priority level, the node passes on to a fourth step 530 in which the node complies with the constraint ownConstraint.

In this step 530, the node sends the message having a low priority level in the predefined subset of frames specific to its own group.

The node transmits the message having a low priority level only once per frame belonging to the subset of frames specific to the group of the node.

The node transmits in this case the message having a low priority level as well as the constraint neighbourConstraint that it has calculated, in a slot belonging to a frame of the predefined subset of frames specific to the group.

If the message that the node seeks to transmit to neighbouring nodes is a message having a high priority level, the node proceeds to a fifth step 540. The node sends the message having a high priority level in a set of slots and a set of frames which depend on the probability of reception of the message by at least one neighbour of the node.

The step 540 of the method according to the invention is different based on three embodiments of the method according to the invention.

In a first embodiment, the message having a high priority level is transmitted several times in the same frame of a same given cycle.

In a second embodiment, the message having a high priority level is transmitted only once per frame but in a set of frames larger than the predefined frame set specific to the group. The node sends the high priority level message in one slot per frame, by using q frames of a same given cycle. This equates to authorising the transmitting node that is the sender of the high priority message to belong to different groups.

A third embodiment combines the previous two embodiments. In this case, the node sends the high priority level message in at least two slots per frame, in at least two frames of a same given cycle. In this third embodiment, the node transmits the high priority level message several times in several frames per cycle.

In the first embodiment, in the fifth step 540, the node transmits the high priority level message in one single frame T2 belonging to the predefined subset of frames specific to its own group, according to the method as in FIG. 2.

Figure 21:
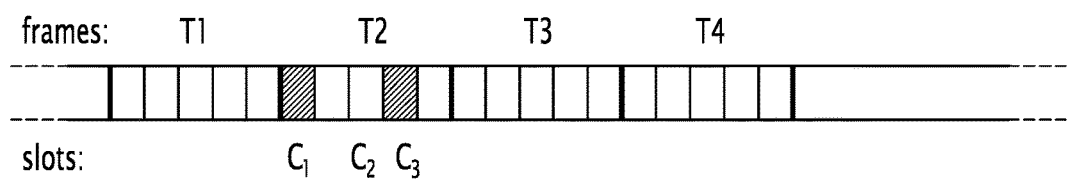
FIG. 21 is a schematic view showing the dispatching of a message having a high priority level over a single frame.

The node transmits the high priority level message in at least two slots c1, c2, c3 of one single frame of the T2 of the predefined subset of frames specific to its own group from among the successive frames T1, T2, T3, T4, as shown in FIG. 21.

For example, the node transmits the same high priority level message in three slots c1, c2, c3 of the single frame T2.

The node transmits the high priority level message in a number of slots m of the sole frame T2 which depends on a probability P1, desired by the sender node, of the message being received by at least one of its neighbouring nodes. P1 and m satisfy the relationship:

$$P1 = \left(1 - \frac{1}{n}\right)^{N-1-T} \left[\prod_{k=1}^{m-1} \left(1 - \frac{1}{n-k}\right)\right]^T \tag{6}$$

where:
N is the number of neighbouring nodes of the node all transmitting in a same given frame,
T is the number of neighbouring nodes of the node having available a high priority level message to be transmitted, and
n is the number of time slots per frame.

In a table the calculation is performed of the values of probability P1 of the message being received by at least one of the neighbours of the node, by varying the parameters m, N, T, n. This table is a correlation table correlating these parameters.

The table is stored in a memory storage which the node accesses, for example a memory storage of the node, in order for the node to rapidly determine the number of slots m in which it will transmit based on the probability P1.

The node knows the values of N, T, n and P1. The node infers therefrom, by using the table, the value of m to be used to achieve a value that is the closest possible to P1.

Once the number of slots m has been obtained, the node determines the slots c1, c2, c3 in which it is going to transmit. The slots c1, c2, c3 are drawn randomly and without replacement in the sole frame T2 of the predefined subset of frames specific to the group.

In this first embodiment, the equation establishing the value of the probability P1 of reception of the message having a high priority level based on different parameters N, T, n and m, is obtained based on the considerations following here below.

Hereinafter the elements hereunder are denoted as follows:

V(S), the set of neighbouring nodes of a considered node S and all transmitting in a same given frame.

V(Sstd), the set of nodes belonging to V(S) and having available a message having a low priority level to be transmitted.

V(Sal), the set of nodes belonging to V(S) and having available a message having a high priority level to be transmitted.

N, the number of nodes belonging to V(S). N is estimated based on the constraint sent.

T, the number of nodes belonging to V(Sal). There are thus N−T nodes belonging to V(Sstd). T is deduced from N and from the percentage of nodes in range that may possibly send a message having a high priority level at the same time.

E, a node belonging to V(Sal).

F, a node belonging to V(Sstd).

N, the number of slots per frame. n is a fixed configuration parameter and is known to all the nodes.

m, the number of slots used in one frame for transmitting a message having a high priority level. The nodes of V(Sstd) have available one slot per frame per message.

q, the number of frames used in one cycle for transmitting a message having a high priority level. The nodes of V(Sstd) have available one frame per cycle per message.

m and q, are variables that it is desired to set in order to achieve a given probability of reception of a message having a high priority level.

p(R×C), the probability of the message sent by a node C, C∈V(S) being received by the node S.

The node E has available a message having a high priority level to be sent. It therefore transmits m times the message having a high priority level over a set of slots A={x1, . . . , xm}. The probability of the high priority level message transmitted by the node E being received by the node S is equal to the probability of the high priority level message being received at least once out of the m emissions from E.

Let Sr be the event: "the message is received over the xr slot with xr belonging to the set A". There is then:

$$p(Rx_E) = p\left(\bigcup_{l=1}^{m} S_l\right) \quad (7)$$

The probability of selecting a slot being uniform and equal for all the nodes, the following is obtained:

$$p(Rx_E) = \sum_{k=1}^{m} \left[(-1)^{k+1} C_m^k p\left(\bigcap_{l=1}^{k} S_l\right)\right] \quad (8)$$

On the other hand, the probability of the high priority level message being received over k slots $$p\left(\bigcap_{l=1}^{k} S_l\right)$$

corresponds to the probability of none of the N−1 remaining nodes using one of the k slots. In other words, none of the N−T nodes of V(Sstd) selects one of the k slots and none of the T−1 other nodes of V(Sal) selects one of the k slots among the m slots that they each select.

The drawing of the m slots used for the transmission of a high priority level message is done without replacement.

The node E hence selects the first slot from among n, thus with a probability of 1/n, then selects the second slot from among the n−1 remaining slots thus with a probability of 1/(n−1), . . . and then finally selects the m-th slot from among the 1−1/(n−(m−1)) remaining slots. The following is thus obtained:

$$p\left(\bigcap_{l=1}^{k} S_l\right) = \left(1 - \frac{k}{n}\right)^{N-T} \prod_{j=0}^{m-1} \left(1 - \frac{k}{n-j}\right)^{T-1} \quad (9)$$

hence:

$$p(Rx_E) = \sum_{k=1}^{m} \left[(-1)^{k+1} C_m^k \left(1 - \frac{k}{n}\right)^{N-T} \prod_{j=0}^{m-1} \left(1 - \frac{k}{n-j}\right)^{T-1}\right] \quad (10)$$

On an indicative basis, the probability of reception of a message having a low priority level by the node S when T nodes are sending high priority level messages then varies as presented here below.

The node F has available one slot of the frame for sending a message having a low priority level. P(RXF) therefore corresponds to the probability that none of the N−T−1 other nodes of V(Sstd) will select the same slot as F and that the T nodes of V(Sal) will not select the same slot as F among the m slots that they each select. It should be recalled that the drawing of slots for high priority level messages is done without replacement. The following is thus obtained:

$$p(Rx_E) = \left(1 - \frac{1}{n}\right)^{N-1-T} \left[\prod_{k=1}^{m-1} \left(1 - \frac{1}{n-k}\right)\right]^{T} \quad (11)$$

In this first embodiment, the messages having a high priority level are sent in a greater number of slots than the messages having a low priority level, in the frame belonging to the predefined subset of frames specific to the group of the node.

In addition, a node sends one same low priority level message only in one slot of one single frame of the predefined subset of frames specific to the group of the node.

Thus the node transmits any high priority level message a greater number of times than any low priority level message.

This solution presents the advantage of impacting the probabilities of reception only of the nodes belonging to the same group as the sender node transmitting the high priority level message.

Figure 22:
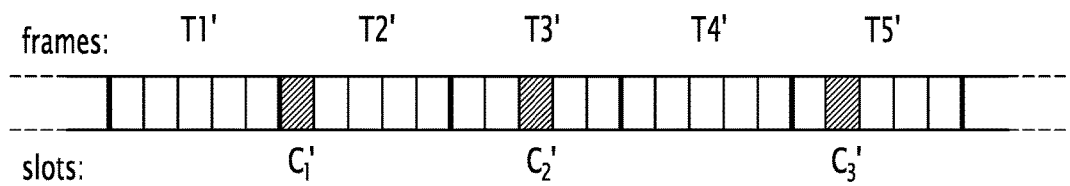
FIG. 22 is a schematic view showing the dispatching of a message having a high priority level over multiple frames.

In the second embodiment, during the step 540, the node transmits the high priority level message in a unique slot c1', c2', c3' of at least two distinct frames T2', T3', T5' from among the successive frames T1', T2', T3', T4', T5' as illustrated in FIG. 22.

In this case, the node transmits the high priority level message only once per frame T2', T3', T5' of a same given cycle whereof one T2' is part of the predefined subset of frames specific to the group.

Preferably, only one frame T2' is part of the predefined subset of frames specific to the group.

In the example shown in FIG. 22, the node transmits the high priority level message in a slot c1' of one of the frames T2' belonging to the subset of frames specific to the group of the node and sends the same message in slots c2', c3' of distinct separate frames T3' and T5'.

The node transmits the high priority level message in a number of frames q which depends on a probability P2 desired by the transmitting node, of the message being received by at least one of its neighbouring nodes. P2 and q satisfy the relationship:

$$P2 = \sum_{k=1}^{q} \left[ (-1)^{k+1} C_q^k \left(1 - \frac{1}{n}\right)^{k(N-1)} \right] \quad (12)$$

with the elements being denoted identically as in the first embodiment.

In this case, a second table is obtained in a manner analogous to the first embodiment. In this second table the values are calculated for the probability P2 of the message being received by at least one of the neighbours of the node, by varying the parameters q, N, T, n.

The node knows the values of N, n and P2. It infers therefrom the value of q to be used to achieve a value that is the closest possible to P2, by using this second table.

Once the number of frames has been calculated, the node determines the frames in which it is going to transmit.

The first frame selected T2' is included in the predefined subset of frames specific to the group of the node. The other frames T3', T5' are drawn randomly without replacement.

In this second embodiment, the equation establishing the value of the probability of reception of the high priority level message P2 based on the different parameters N, n and q, is obtained on the basis of the following considerations, while maintaining the denotation scheme of the first embodiment.

Let B={y1, . . . , yq} be the set of frames used for transmitting the high priority level message, the probability of reception of a message having a high priority level by a considered node S corresponds to the probability of the message being received in at least one of the q frames.

Let Yi be the event "the high priority level message has been received in the frame yi", then:

$$p(Rx_E) = p\left(\bigcup_{i=1}^{q} Y_i\right) \quad (13)$$

This probability depends mainly on the amount of neighbouring transmitters in the other frames. It therefore needs to be calculated on a case by case basis. However, under the assumption that the probabilities of reception are identical in each frame, the following are obtained:

$$p(Y_i) = p(Y), \forall i \in B \quad (14)$$

$$\text{and } p(Rx_E) = \sum_{k=1}^{q} \left[ (-1)^{k+1} C_q^k p\left(\bigcap_{i=1}^{k} Y_i\right) \right]$$

On the other hand, the reception of messages in the different frames are independent events. Hence:

$$p\left(\bigcap_{i=1}^{k} Y_i\right) = p(Y)^k$$

Which results in $$p(Rx_E) = \sum_{k=1}^{q} \left[ (-1)^{k+1} C_q^k p(Y)^k \right] \quad (15)$$

In this solution, all the nodes of V(S) are transmitting in one single slot per frame, thus, $$p(Y_1) = \left(1 - \frac{1}{n}\right)^{(N-1)}$$

There finally remains, $$p(Rx_E) = \sum_{k=1}^{q} \left[ (-1)^{k+1} C_q^k \left(1 - \frac{1}{n}\right)^{k(N-1)} \right] \quad (16)$$

The message having a high priority level is sent in a greater number of frames than any message having a low priority level. In each frame the high priority level message is sent at most once and the low priority level message is sent at most once.

Thus, in this second embodiment, the node sends a greater number of high priority level messages than the number of low priority level messages.

In the third embodiment, during the step 540, the node transmits the high priority level message in at least two slots of at least two distinct and separate frames.

In this case, the node transmits the high priority level message multiple times per frame and in multiple frames of a cycle.

The node transmits the high priority message in a number of slots m and in a number of frames q that depend on the probability P3 of the message being received by at least one of its neighbouring nodes. P3, m and q satisfy the relationship:

$$P3 = \sum_{k=1}^{q} \left[ (-1)^{k+1} C_q^k p(Y)^k \right] \quad (17)$$

$$\text{with } p(Y) = \sum_{k=1}^{m} \left[ (-1)^{k+1} C_m^k \left(1 - \frac{k}{n}\right)^{N-T} \prod_{j=0}^{m-1} \left(1 - \frac{k}{n-j}\right)^{T-1} \right] \quad (18)$$

with the same denotation schemes used as in the first and in the second embodiments.

In this case, a third table is obtained in a manner analogous to the first and second embodiments. In this third table the values are calculated for the probability P3 of the message being received by at least one of the neighbours of the node, by varying the parameters q, N, T, n.

The node knows the values of N, T, n and P3. It infers therefrom the value of m and q to be used to achieve a value that is the closest possible to P3, based on this third table.

Once the number of m slots and the number of frames q have been calculated, the node determines the slots and the frames in which it is going to transmit.

A frame is included in the predefined subset of frames. The other frames are drawn randomly and without replacement. The slots are also drawn randomly and without replacement within the frames.

Preferably, only one single frame is included in the predefined subset of frames.

In this second embodiment, the equation establishing the value of the probability of reception of the message having a high priority level P3 based on different parameters N, T, n and m and q is obtained based on the following considerations, while maintaining the denotation schemes of the first and second embodiments.

Let B={y1 . . . yq} be the set of frames used for transmitting the high priority level message, the probability of reception of a message having a high priority level by a considered node S corresponds to the probability of the message being received in at least one of the q frames.

Let Yi be the event "the high priority level message has been received in the frame yi", then:

$$p(Rx_E) = p\left(\bigcap_{i=1}^{k} Y_i\right) \quad (19)$$

Each P(Yi) is then calculated on a case by case basis with the Equation (10).

In the worst case, all the nodes transmitting a high priority level message select the same frames. The probabilities of reception are identical in each frame, the following are obtained:

$$p(Yi) = p(Y), \forall i \in B \quad (20)$$

$$\text{and } p(Rx_E) = \sum_{k=1}^{q}\left[(-1)^{k+1} C_q^k p\left(\bigcap_{i=1}^{k} Y_i\right)\right]$$

On the other hand, the reception of messages in the different frames are independent events. Hence:

$$p\left(\bigcap_{i=1}^{k} Y_i\right) = p(Y)^k$$

Which results in:

$$p(Rx_E) = \sum_{k=1}^{q} [(-1)^{k+1} C_q^k p(Y)^k] \quad (21)$$

With P(Y) calculated using the equation (10).

This third embodiment combines the advantages of the first and second embodiments.

The invention claimed is:

1. A message transmission method for transmitting messages in an ad hoc network comprising at least two transmitter-receiver nodes that are capable of receiving and transmitting messages and communicating with each other through the dispatch of messages within random access time slots organised in frames, the nodes of the network being distributed into groups in accordance with a basic distribution rule, with the nodes in each group having the right to send messages in one time slot per frame of a predefined subset of frames specific to the group in accordance with the basic distribution rule, characterised in that:
the messages include at least messages having a low priority level and messages having a high priority level;
each of the nodes transmits the low priority level messages only in one time slot per frame of the predefined subset of frames specific to its own group;
each of the nodes transmits the high priority level messages in one time slot (c1; c1') per frame of the predefined subset of frames specific to its own group (T2; T2') and in at least one other time slot (c2, c3; c2', c3'), the node transmitting any message having a high priority level a greater number of times than any message having a low priority level; and
each node defines a constraint for the neighbouring nodes, each node transmitting the defined constraint to the neighbouring nodes, and each node defines the group to which it belongs in accordance with the distribution rule based on the constraints received from the neighbouring nodes.

2. A method according to claim 1, characterised in that each of the nodes transmits the high priority level messages in at least two time slots (c1, c2 c3) of a single frame (T2) of the predefined subset of frames specific to its own group.

3. A method according to claim 2, characterised in that the node transmitting a high priority level message transmits, based on the probability P1 of the message being received by at least one of its neighbouring nodes, the high priority level message in a number of time slots m satisfying the relationship:

$$P1 = \sum_{k=1}^{m}\left[(-1)^{k+1} C_m^k \left(1-\frac{k}{n}\right)^{N-T} \prod_{j=0}^{m-1}\left(1-\frac{k}{n-j}\right)^{T-1}\right]$$

where
N is the number of neighbouring nodes of the node all transmitting in a same given frame;
T is the number of neighbouring nodes of the node having available a high priority level message to be transmitted; and
n is the number of time slots per frame.

4. A method according to claim 1, characterised in that each of the nodes transmits the high priority level messages in a single time slot (c1', c2', c3') of at least two distinctly separate frames (T2', T3', T5').

5. A method according to claim 4, characterised in that the node transmitting a high priority level message transmits, based on the probability P2 of the message being received by at least one of its neighbouring nodes, the high priority level message in a number of frames q satisfying the relationship:

$$P2 = \sum_{k=1}^{q}\left[(-1)^{k+1} C_q^k \left(1-\frac{1}{n}\right)^{k(N-1)}\right]$$

where
- N is the number of neighbouring nodes of the node all transmitting in a same given frame;
- T is the number of neighbouring nodes of the node having available a high priority level message to be transmitted; and
- n is the number of time slots per frame.

6. A method according to claim 1, characterised in that each of the nodes transmits the high priority level messages in at least two time slots of at least two distinctly separate frames.

7. A method according to claim 6, characterised in the node transmitting a high priority level message transmits, based on the probability P3 of the message being received by at least one of its neighbouring nodes, the high priority level message in a number of time slots m and a number of frames q satisfying the relationship:

$$P3 = \sum_{k=1}^{q} [(-1)^{k+1} C_q^k p(Y)^k]$$

$$\text{with } p(Y) = \sum_{k=1}^{m} \left[ (-1)^{k+1} C_m^k \left(1 - \frac{k}{n}\right)^{N-T} \prod_{j=0}^{m-1} \left(1 - \frac{k}{n-j}\right)^{T-1} \right]$$

where
- N is the number of neighbouring nodes of the node all transmitting in a same given frame;
- T is the number of neighbouring nodes of the node having available a high priority level message to be transmitted; and
- n is the number of time slots per frame.

8. A method according to any one of claims 4 to 7, characterised in that only one frame is included in the predefined subset of frames.

9. A method according to claim 1, characterised in that the distribution rule of a node in a group takes into account the number of neighbouring transmitter nodes or interfering nodes that the neighbouring nodes of the node considered have.

10. An ad hoc network comprising a set of transmitter-receiver nodes that are capable of receiving and transmitting messages and communicating with each other through the dispatch of messages in random access time slots organised in frames, characterised in that each node includes the means for implementation of the method according to any one of the preceding claims.

* * * * *